United States Patent [19]
Gross

[11] 3,847,695
[45] Nov. 12, 1974

[54] RIMLESS RECAPPING APPARATUS UTILIZING BALANCED AIR PRESSURES

[76] Inventor: Jerome A. Gross, 6304 S. Rosebury, St. Louis, Mo. 63105

[22] Filed: June 28, 1973

[21] Appl. No.: 374,675

[52] U.S. Cl............... 156/96, 23/290, 156/394 FM, 156/128, 264/36, 264/315, 425/23, 425/25, 425/43, 425/47
[51] Int. Cl..................... B29h 5/04, B29h 17/36
[58] Field of Search... 156/96, 128 R, 394, 394 FM; 425/39, 43, 44, 45; 264/36, 315

[56] References Cited
UNITED STATES PATENTS

| | | | |
|---|---|---|---|
| 3,236,709 | 2/1966 | Carver | 156/394 FM |
| 3,325,326 | 6/1967 | Schelkmann | 156/394 FM |
| 3,729,358 | 4/1973 | Barefoot | 156/394 FM |
| 3,730,801 | 5/1973 | Martin | 156/394 FM |
| 3,743,564 | 7/1973 | Gross | 156/394 FM |
| 3,745,084 | 7/1973 | Schelkmann | 156/394 FM |
| 3,769,121 | 10/1973 | Martin | 156/394 FM |

*Primary Examiner*—Clifton B. Cosby

[57] ABSTRACT

Tire recapping apparatus utilizes a hoop, larger in diameter than the casings to be recapped, over which the bent-up edge of a lower elastic membrane is everted, and the bent-down edge of a similar upper membrane is drawn, for sealing. A tire casing with recap strip in place, enveloped between the membranes, contains an inner tube preliminarily inflated to roundness through a hose leading through the upper membrane. the membranes are then evacuated to apply atmospheric pressure against the assembly, supporting the rounded tube between the beads. Thereafter free communication of ambient air is permitted through the hose to the tube; when vulcanized in a pressure chamber the tube pressure rises and falls with the pressure in the chamber, maintaining the shape of the casing undistorted without any air pressure connection from outside the chamber.

8 Claims, 3 Drawing Figures

RIMLESS RECAPPING APPARATUS UTILIZING BALANCED AIR PRESSURES

BACKGROUND OF THE INVENTION

This invention relates to recapping of pneumatic tires by the use of preformed tread strips, vulcanized to the buffed outer periphery of the casings to be recapped.

Vulcanization is conventionally carried out in a heated pressure chamber, under about 85 p.s.i. pressure. In the most commonly used procedure, each casing is prepared by buffing off the old tread, applying a vulcanizable rubber compound, and fitting over it a peripheral length of rugged, pre-formed, precured tread rubber. Over this assembly a cover, U-shaped in radial section, is fitted, with its edges secured by the casing beads against the flanges of special steel rims, of diameter and width to fit the particular casing. The casing (or an inner tube within it) is inflated to say 35 pounds pressure above atmospheric, to hold the edges of the U-shaped cover sealedly clamped between the outward-pressed casing beads and the rim flanges. The assembly is then placed in a vulcanizing pressure chamber and an inflation hose attached to lead from the tube (or casing interior) through the wall of the pressure chamber to an external pressed source. A vent tube leading through the pressure chamber wall is connected to vent the cover to outside atmospheric pressure. Then, as pressure is applied and reduced within the pressure chamber, the external pressure source is so valved as to maintain a 35 p.s.i. excess pressure within the casing over the pressure within the chamber.

To avoid the need for such special rims, a system has been devised using elastic enveloping membranes whose curved edges overlap each other at the casing periphery; but such overlapping has not provided consistently adequate sealing, particularly after the rubber membranes have been subjected repeatedly to the heat and other stresses of vulcanization. Also, recapping casings off rims, using a preliminarily inflated inner tube, has been demonstrated with complex valving apparatus which opened to admit to the tube increased pressures within the vulcanizing chamber, and "blew off" to vent excess pressures within the tube as the chamber pressure was decreased. The time lag and differentials of pressure inherent in such valving apparatus may cause changes of conformation of the casing being recapped before vulcanization is completed.

SUMMARY OF THE INVENTION

The present invention is adapted to overcome the deficiencies in prior art apparatus and methods. It effects recapping within a pressure chamber without any air inlet connection from outside the chamber to the inner tube. Enveloping membrane means, adapted to be sealed at the outer margins outwardly of the casing with tread strip in place, have central portions which extend opposite each other to enclose the central circular space between the beads of the casing to be recapped. An air evacuation outlet is provided, extending through the membrane means to a check valve, to maintain vacuum between the membranes. An ordinary inner tube, positioned within the tire casing, is connected to the exterior of the membrane means by inner tube pressure balancing means including an inflation inlet extending through the membrane means from an inlet connection, and a pressure hose extending to a coupling connectable to the inner tube.

Elastic membranes are preferred. To seal the outer margins of such membranes, a rigid hoop is provided. The lower elastic membrane has an upward extending margin; it is placed in the hoop and its margin everted thereover. The casing, assembled for recapping, is placed thereon. The upper membrane, with its margin extending downward, is positioned thereover and its margin drawn elastically over that of the everted lower membrane outwardly of the hoop, where they are sealed together.

DESCRIPTION OF THE PREFERRED EMBODIMENT

Figure 1:
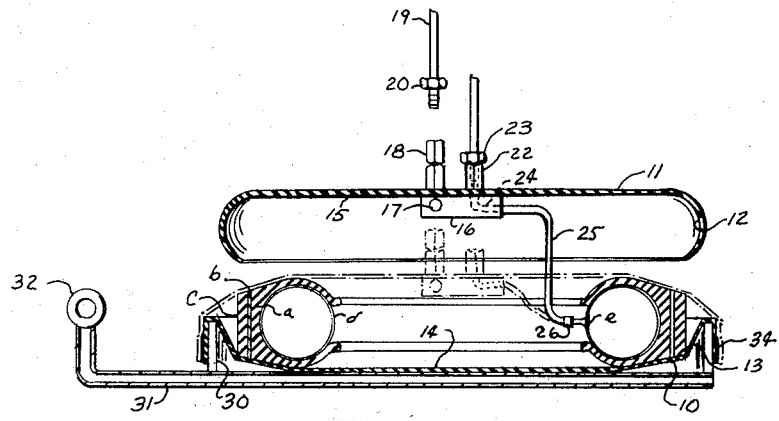
FIG. 1 shows the apparatus of the present invention with a tire casing, assembled for recapping, lying on the lower membranes, with the upper membrane shown thereover. The phantom lines show the position of the parts after the upper membrane is drawn over the lower membrane.

A tire casing $a$ preliminarily buffed to provide a substantially cylindrical periphery, has a vulcanizable gum rubber coating $b$ applied thereto and a preformed, precured tread strip $c$ mounted in place thereon, as is conventional. An inner tube $d$ having a stem or core $e$ without any valve is positioned within the casing $a$.

The apparatus shown includes a lower membrane 10 and an upper membrane 11. Each is of an elastic rubber or rubber-like material, with curving margins extending out of the general plane of the membranes; these may be formed by cutting from a large size inner tube. Thus, as seen with the membrane 11 shown positioned upwardly in FIG. 1, its margin 12 extends curvedly downward, while the margin 13 of the lower membrane 10 is formed to extend upward.

Each of the membranes 10, 11 include central portions 14, 15 which extend opposite each other to enclose the central circular space between the beads of the casing $a$. Sealedly secured to the central portion 15 of the upper membrane 11 is a spacing block 16, preferably formed of metal. It contains an air evacuation passage 17, whose outlet end is in a side margin of the block 16, and which has an upward connection outwardly through the membrane to a vacuum check valve 18. A vacuum line 19 from a source of vacuum not shown terminates in a quick disconnect fitting 20 insertable into the check valve 18.

The block 16 also supports on the outer side of the membrane 11 an air inlet connection 22 to which a conventional inflation hose coupling 23 may be intermittently connected to, leading from an air pressure source not shown. Through the block 16 extends a pressure passage 24 connected to a pressure hose 25 having an inner end coupling 26 connectable to the stem $e$ of the inner tube $d$.

A rigid cylindrical hoop 30, formed of steel whose upper edge is smoothly rounded, is welded at diametrically opposite points along its lower edge to a hanger tube 31 which extends beyond it to an upturned end having a hanging eye 32. The diameter of the hoop 30 is larger than any of the casings intended to be recapped, and the depth of the hoop is preferably about half of the thickness of such a casing. The hoop diameter 30 is also larger than that of the elastic marginal edges 12, 13 of the upper and lower membranes 11, 10 when they are unstressed. Thus, the margin 13 of the lower membrane 10 is first elastically everted and drawn outwardly and downwardly over the hoop 30, as shown in FIG. 1.

Figure 3:
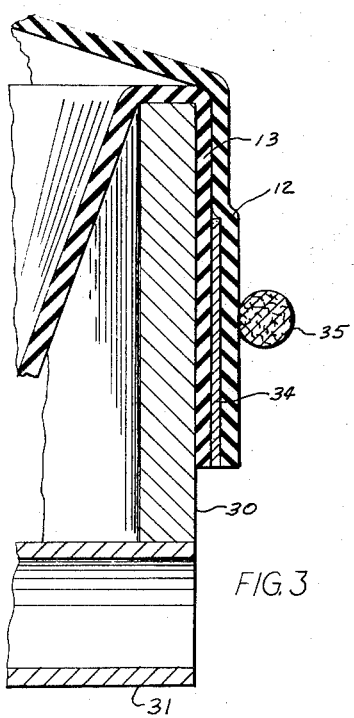
FIG. 3 is an enlarged fragmentary view taken at right side of FIG. 1.

To recap a casing $a$ utilizing the present apparatus and method, the old tread is removed from the outer periphery of the casing $a$, and the gum rubber coating $b$ and the tread strip $c$ are secured in place in the conventional manner. The tube $d$ is positioned within the casing, without support by any inner rim, after which the casing is positioned on the lower membrane 10 as shown in FIG. 1. The pressure hose 25, whose wall must be strong enough to resist the pressure subsequently to be applied in a pressure chamber, is then secured sealedly by its coupling 26 to the stem $e$ of the inner tube $d$. At this stage, even before the upper membrane 11 is put into final position, the inflation hose coupling 23 is applied to the air inlet connection 22 to inflate the tube $d$ to full roundness, to assure its proper positioning within the casing $a$. The upper membrane 11 is then put into the position shown in phantom lines in FIG. 1, with its margin 12 drawn over the everted lower margin 13 of the lower membrane 10. The two margins are then sealed in place. Referring to FIG. 3, a double-sided sealing tape 34 is drawn about the periphery of the everted lower margin 13, so that when the upper margin 12 overlaps the tape 34 a sealed connection is made. Any conventional plastic sealing tape may be used which will adhere to the membrane margins 12, 13 and maintain its seal under the temperature applied on vulcanization.

Figure 2:
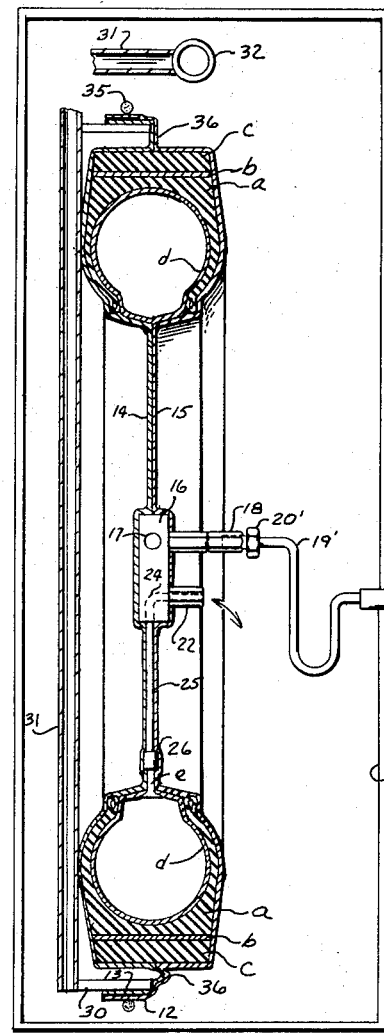
FIG. 2 shows the assembly of FIG. 1 with the membranes evacuated, hanging within a pressure chamber during vulcanizing.

As an additional or alternate seal, a tensioning cord 35 seen in FIGS. 2 and 3 may be drawn tightly about the overlapping elastic margins, to apply its tension against the resistance of the rigid hoop 30.

With the upper membrane 11 in place, the disconnect fitting 20 of the vacuum line 19 is applied to the check valve 18, drawing the membranes 10, 11 together as shown in FIG. 2. For purpose of completing air evacuation, a conventional wicking cloth, such as a loosely woven fiberglass cloth, may be laid beneath the casing $a$ on the lower membrane 10; such wicking means are so conventional as to require no illustration. As the vacuum is applied, care must be taken to see that the inner tube $d$ remains in place; thus it may be necessary to add inflating air pressure to maintain the natural conformation of the casing $a$ as the vacuum is drawn, establishing it as seen in FIG. 2. The inflation hose coupling may then be withdrawn, so that the pressure within the tube $d$ may equalize itself to the ambient air pressure through its unvalved stem $e$, the pressure hose 25, the pressure passage 24 and the unvalved air inlet connection 22.

Examination of FIG. 2 shows that the central portions 14, 15 of the membranes 11, 10 have been drawn together immediately inward of the beads of the casing $a$, to support the radially inner portion of the tube $d$. Since the inner space has been evacuated, the tube $d$ will swell inward into the juncture of the drawn-together membranes, filling like a mandrel the entire space between the casing beads. The portions of the membranes 10, 11 between the hoop 30 and the tread strip $c$ will have been forced tightly together in an annular sealing area 36 which supplements the sealing outwardly of the hoop 30. The assembly may be lifted by the hanging eye 32 of the hoop 30, for suspension within a pressure chamber 37 whose walls are shown schematically in FIG. 2. On such lifting the annular sealing area 36 may be distort harmlessly as the casing $a$ sags from center from the hoop 30 which nevertheless supports it adequately.

Passing sealedly through the wall of the pressure chamber is a second vacuum line 19' whose disconnect fitting 20' is then inserted in the vacuum check valve 18. The door of the pressure chamber 37 is then closed sealedly and air pressure introduced while vulcanizing heat is applied. As the air pressure rises to say 85 p.s.i., its increase is communicated to the interior of the inner tube $d$ without any appreciable time lag, because there are no valves in the tube stem $e$ or the passages leading thereto. Hence a balancing pressure will be constantly maintained within the inner tube $d$ so that the shape in which the casing $a$ is held for vulcanization, preliminarily established when the membranes were evacuated, is not altered by the increase of pressure within the vulcanizing chamber to say 85 p.s.i. The tread strip $c$ is thus vulcanized under pressure exerted evenly inside and out. Likewise, on lowering the pressure in the chamber 37 at the close of the vulcanizing operation, the open connection to the inner tube $d$ maintains the decreasing pressures on the casing $a$ in constant balance.

Inasmuch as the gum rubber coating $b$ on the vulcanization gives forth gases which must be removed from the area being vulcanized, and further since slight imperfections of sealing of the membranes 10, 11 may exist, a constant vacuum is applied through the line 19' during the entire time that pressure is in the chamber 37. When the operation has been completed, the disconnect fitting 20' is released and the assembly is removed from the pressure chamber. Then, if a tensioning cord 35 has been utilized, it is released, the upper membrane margin 12 is pulled loose from the sealing tape 34, the air inlet coupling 26 released, and the inner tube $d$ removed from the now-recapped casing.

It is to be noted that, assuming the future availability of some reliable pressure-curable adhering agent which gave forth no gases or curing, and assuming that a perfect seal of the membranes 10, 11 could be maintained, it would not be necessary to connect the line 19', for the vacuum would be held by the check valve 18.

For reuse of the membranes 10, 11, the sealing tape 34 is cleaned from their margins 12, 13. Then, a second casing to be recapped, with its tread strip in place, may be utilized in the apparatus and with the method described.

A single set of the present apparatus will accommodate a substantial range of diameters and thicknesses of the tire casings, for the membranes 10, 11 are sized to fit the hoop 30 rather than any particular size of tire casing. The depth of the hoop 30 may vary from approximately 20 to 80 percent of the thickness of the casing to be recapped therein. Also, the hoop 30 may be used horizontally in a pressure chamber, rather than suspended vertically.

The present method may be followed even without the hoop 30, utilizing other conventional means to seal the enveloping membranes including thin flexible pressure bags without substantial elasticity but of sufficient size that evacuation will draw them inward between the beads of the casing, as shown in FIG. 2. These, and other modifications in apparatus and method which will suggest themselves to persons having ordinary skill in the art, may have practical advantages in particular situations, with corresponding partial loss of the advantages of the preferred embodiment illustrated and described.

I claim:

1. For use in a pressurizable chamber for vulcanizing a pre-formed tread strip to a tire casing containing an unvalved inner tube without any air inlet connection from outside the chamber, evacuable membrane apparatus comprising enveloping membrane means having upper and lower portions terminating in outer margins at which the membrane means is adapted to be sealed and having central portions which extend opposite each other to enclose the central circular space between the beads of such casing, an air evacuation outlet extending through said membrane means and having outwardly thereof check valve means to maintain vacuum between the membranes, and inner tube pressure-balancing means including an inflation inlet extending through said membrane means and having outwardly thereof an inlet connection and communicating through said membrane means to a pressure hose extending to an inner end coupling connectable to such inner tube, whereby, after the inflated rounding of such inner tube and subsequent evacuation of such central space, to provide pressure within such inner tube balancing increases and decreases of pressure within such chamber.

2. The apparatus as defined in claim 1, wherein the inflation inlet and pressure hose are unvalved, whereby such balancing pressure is maintained substantially without lagging despite increases and decreases in pressure within the vulcanizing chamber, thereby maintaining unaltered the conformation of the tire casing.

3. The apparatus as defined in claim 1, wherein the enveloping membrane means comprises an elastic lower membrane having an upward-extending margin and elastic upper membrane having a downward-extending margin, in combination with a rigid hoop having a diameter larger than such casing and larger than the marginal edges of said elastic membranes, whereby the lower membrane may be placed within such rim and its margin everted elastically thereover, the casing to be recapped with its tread strip thereon may be placed within the hoop on the lower membrane, and the upper membrane may be positioned thereover and its margin drawn elastically over that of the lower membrane margin outwardly of such hoop.

4. The apparatus as defined in claim 3, together with means to seal the elastic membrane margins on the outer side of said hoop.

5. The apparatus as defined in claim 4, wherein the means to seal comprises a sealing tape adhered around the periphery of the margin of the everted lower membrane and sealing the margin of the upper membrane thereto.

6. The apparatus as defined in claim 4, wherein the means to seal comprises tension means drawn about the hoop externally of said membrane margins, whereby to bind them together.

7. The method of recapping a tire casing without using a rim, comprising the old steps of removing the tread from the outer periphery of the casing and applying thereto a pressure-curable adherent and a pre-formed tread strip thereover in place for recapping, together with the steps of positioning an inflatable inner tube within the casing without support by any inner rim, positioning the casing, with the tube therein, between enveloping membrane means covering the tread strip, side walls and beads of the casing and the circular areas inwardly thereof, making a pressure connection from outwardly of said membrane means to the interior of said inner tube and inflating it to roundness, sealing the membrane means outwardly of the tread strip, evacuating the membrane means, whereby pressure external thereto will press the circular central areas of the membrane means together and supportively against the radially inner surface of the inner tube between the beads of the casing, and then, while maintaining the membrane means evacuated, and while permitting free communication through such pressure connection of air pressure between the inner tube and the atmosphere external to said membrane means, placing the assembly in a pressure chamber, increasing the pressure therein, curing the adherent means, reducing the pressure within the pressure chamber, and removing the cured assembly, whereby as the pressure is increased and decreased within the pressure chamber, balancing pressures will be maintained within the inner tube without connection to any source of pressure external to the pressure chamber.

8. The method as defined in claim 7, wherein the curing process involves vulcanization, together with the step of maintaining a vacuum connection from the evacuated membranes to the exterior of the pressure chamber during such vulcanization, whereby to remove gases generated on curing by vulcanization and to remedy any defective sealing of the membrane means.

\* \* \* \* \*